(12) United States Patent
Zhang et al.

(10) Patent No.: US 12,371,857 B2
(45) Date of Patent: Jul. 29, 2025

(54) METHOD AND APPARATUS FOR ANOMALY DETECTION ON A DOCTOR BLADE OF A PAPERMAKING MACHINE, AND COMPUTING DEVICE

(71) Applicant: AKTIEBOLAGET SKF, Gothenburg (SE)

(72) Inventors: Kaihuan Zhang, Hangzhou (CN); Liang Ding, Shanghai (CN); Gang Cheng, Shanghai (CN)

(73) Assignee: AKTIEBOLAGET SKF, Gothenburg (SE)

( * ) Notice: Subject to any disclaimer, the term of this patent is extended or adjusted under 35 U.S.C. 154(b) by 327 days.

(21) Appl. No.: 17/986,240

(22) Filed: Nov. 14, 2022

(65) Prior Publication Data

US 2023/0203753 A1 Jun. 29, 2023

(30) Foreign Application Priority Data

Dec. 23, 2021 (CN) .......................... 202111588508.4

(51) Int. Cl.
*D21G 3/00* (2006.01)
*D21G 9/00* (2006.01)
*G05B 23/02* (2006.01)

(52) U.S. Cl.
CPC .......... *D21G 3/005* (2013.01); *D21G 9/0054* (2013.01); *G05B 23/0221* (2013.01); *G05B 23/024* (2013.01); *G05B 23/0283* (2013.01)

(58) Field of Classification Search
CPC ........ D21G 3/005; D21G 9/0054; Y02P 90/30
See application file for complete search history.

(56) References Cited

U.S. PATENT DOCUMENTS

| 5,122,839 A | * | 6/1992 | Siegel | ................ G03G 21/0017 |
| | | | | 399/350 |
| 2013/0103326 A1 | * | 4/2013 | Von Drasek | ........... G01N 29/46 |
| | | | | 702/56 |
| 2015/0160001 A1 | * | 6/2015 | Von Drasek | ......... G01B 11/306 |
| | | | | 356/612 |

(Continued)

FOREIGN PATENT DOCUMENTS

| JP | 2004517404 A | * | 6/2004 | ............. D21G 3/005 |
| JP | 2008008996 A | * | 1/2008 | |

*Primary Examiner* — Mi'schita' Henson
(74) *Attorney, Agent, or Firm* — J-TEK LAW PLLC; Scott T. Wakeman; Mark A. Ussai

(57) ABSTRACT

A method for anomaly detection on a doctor blade of a papermaking machine includes obtaining doctor blade-related data, wherein the doctor blade-related data includes working condition data, status monitoring data, and design parameter data of the doctor blade, performing a predetermined data pre-processing on the doctor blade-related data to obtain a pre-processed data set, wherein the pre-processed data set includes processed data respectively corresponding to the working condition data, the status monitoring data, and the design parameter data; performing a predetermined feature extraction on the pre-processed data set, and fusing extracted features to obtain fused feature data; and analyzing the fused feature data based on different anomaly detection processes respectively, to perform a comprehensive anomaly detection on the doctor blade of the papermaking machine.

11 Claims, 6 Drawing Sheets

(56) References Cited

U.S. PATENT DOCUMENTS

| | | |
|---|---|---|
| 2021/0301466 A1* | 9/2021 | Mehtomaa ............ B05C 11/048 |
| 2022/0260979 A1* | 8/2022 | Von Drasek ......... D21G 9/0036 |
| 2023/0203754 A1 | 6/2023 | Zhang et al. |
| 2023/0204156 A1 | 6/2023 | Zhang et al. |
| 2023/0204560 A1 | 6/2023 | Zhang et al. |
| 2024/0233364 A1* | 7/2024 | Kojima ................. B33Y 10/00 |

* cited by examiner

FIG. 1A
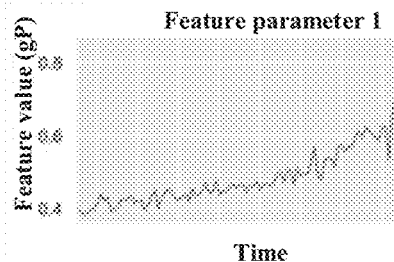
FIG. 1B
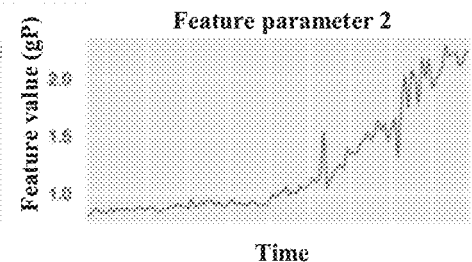
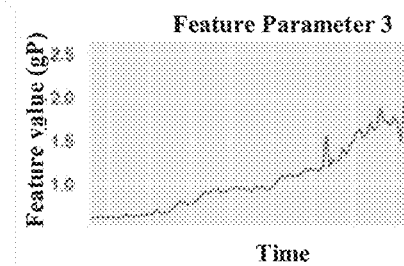
FIG. 1C
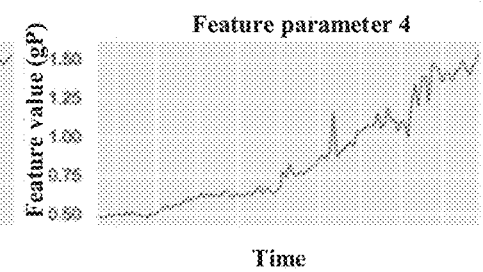
FIG. 1D
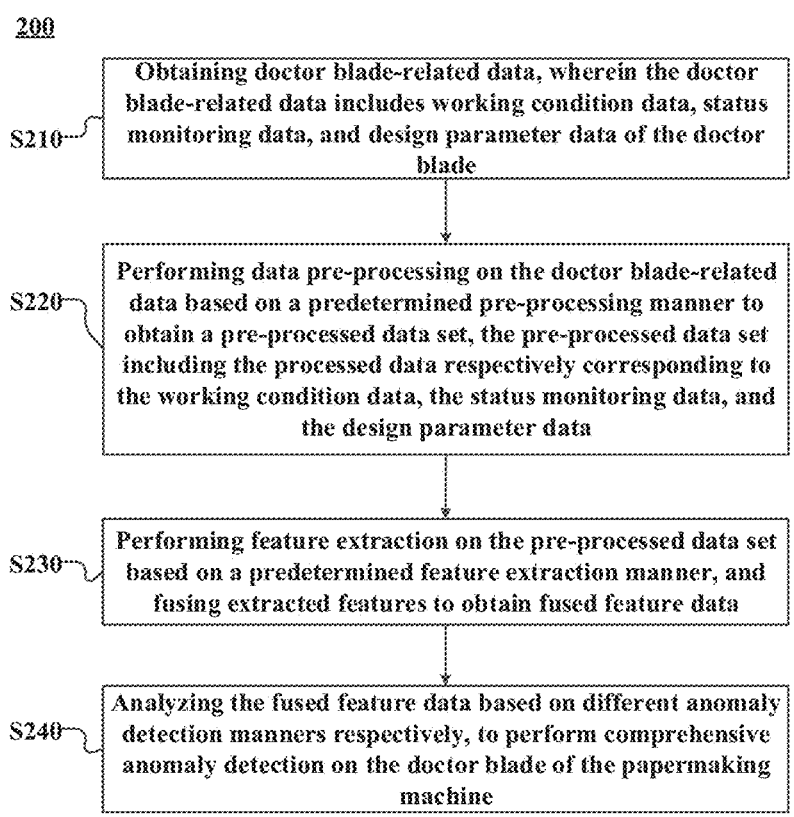
FIG. 2

METHOD AND APPARATUS FOR ANOMALY DETECTION ON A DOCTOR BLADE OF A PAPERMAKING MACHINE, AND COMPUTING DEVICE

CROSS-REFERENCE

This application claims priority to Chinese patent application no. 202111588508.4 filed on Dec. 23, 2021, the contents of which are fully incorporated herein by reference.

TECHNOLOGICAL FIELD

The present disclosure relates to the field of manufacturing, and more particularly, to a method for anomaly detection on a doctor blade of a papermaking machine, an apparatus for anomaly detection on a doctor blade of a papermaking machine, and a computing device.

BACKGROUND

Various types of doctor blades are widely used in papermaking machines, such as creping doctor blades, cleaning doctor blades, etc. A doctor blade is one of the components in papermaking machines that often need to be checked and replaced due to serious wear.

At present, due to insufficient evaluation and optimization, doctor blades of papermaking machines are generally replaced based on the operator's experience, which may lead to inappropriate occasions of doctor blade replacement, and there are also different evaluation criteria depending on different operators. In addition, health status evaluation and anomaly detection on doctor blades of papermaking machines have traditionally been handled through periodic inspection and planned maintenance, and have been handled manually in most cases. This manual manner is usually fixed, inflexible, on-site and experience-based, which leads to excessive or insufficient doctor blade maintenance, in this case, the doctor blades can be replaced only when the "hand feel" is bad, and the doctor blades cannot be checked and replaced in a timely manner when anomaly occurs to the doctor blades.

Therefore, there is a need for a solution to automatically and comprehensively detect anomaly of the doctor blades of the papermaking machines, so that the doctor blades can be replaced at an appropriate occasion.

SUMMARY

In accordance with an aspect of the present disclosure, there is provided a method for anomaly detection on a doctor blade of a papermaking machine, comprising: obtaining doctor blade-related data, wherein the doctor blade-related data includes working condition data, status monitoring data, and design parameter data of the doctor blade; performing data pre-processing on the doctor blade-related data based on a predetermined pre-processing manner to obtain a pre-processed data set, wherein the pre-processed data set includes processed data respectively corresponding to the working condition data, the status monitoring data, and the design parameter data; performing feature extraction on the pre-processed data set based on a predetermined feature extraction manner, and fusing extracted features to obtain fused feature data; and analyzing the fused feature data based on different anomaly detection manners respectively, to perform a comprehensive anomaly detection on the doctor blade of the papermaking machine.

In accordance with another aspect of the present disclosure, there is provided an apparatus for anomaly detection on a doctor blade of a papermaking machine, comprising: an acquisition module configured to obtain doctor blade-related data, wherein the doctor blade-related data includes working condition data, status monitoring data, and design parameter data of the doctor blade; a pre-processing module configured to perform data pre-processing on the doctor blade-related data based on a predetermined pre-processing manner to obtain a pre-processed data set, wherein the pre-processed data set includes processed data respectively corresponding to the working condition data, the status monitoring data, and the design parameter data; a feature extraction module configured to perform feature extraction on the pre-processed data set based on a predetermined feature extraction manner and to fuse extracted features to obtain fused feature data; and an anomaly detection module configured to analyze the fused feature data based on different anomaly detection manners respectively, to perform a comprehensive anomaly detection on the doctor blade of the papermaking machine.

In accordance with yet another aspect of the present disclosure, there is provided a computing device, comprising: a processor; a memory having stored thereon a computer program which, when executed, causes the processor to implement respective steps of the method for anomaly detection on a doctor blade of a papermaking machine as described above.

In accordance with yet another aspect of the present disclosure, there is provided a non-transient computer readable storage medium having stored thereon a computer program which, when executed by a processor, causes the processor to implement respective steps of the method for anomaly detection on a doctor blade of a papermaking machine as described above.

In accordance with yet another aspect of the present disclosure, there is provided a computer program product comprising a computer program which, when executed by a processor, causes the processor to implement respective steps of the method for anomaly detection on a doctor blade of a papermaking machine as described above.

Through the method, apparatus, computing device, non-transient computer readable storage medium, and computer program product for anomaly detection on a doctor blade of a papermaking machine according to the embodiments of the present disclosure, comprehensive anomaly detection is performed on the features of the doctor blade by combining various different anomaly detection manners, a more comprehensive method and indicator can be obtained based on the three-level fusion of data level, feature level and decision level to reflect the anomaly risk of the doctor blade, so that more accurate and timely warning, alarm, feedback and optimization strategies can be provided for the doctor blade.

BRIEF DESCRIPTION OF THE DRAWINGS

FIGS. 1A-1D are schematic diagrams of feature values of four feature parameters of a doctor blade changing over time.

FIG. 2 is a flowchart of a method for anomaly detection on a doctor blade of a papermaking machine according to the embodiments of the present disclosure.

DETAILED DESCRIPTION

Figure 3:
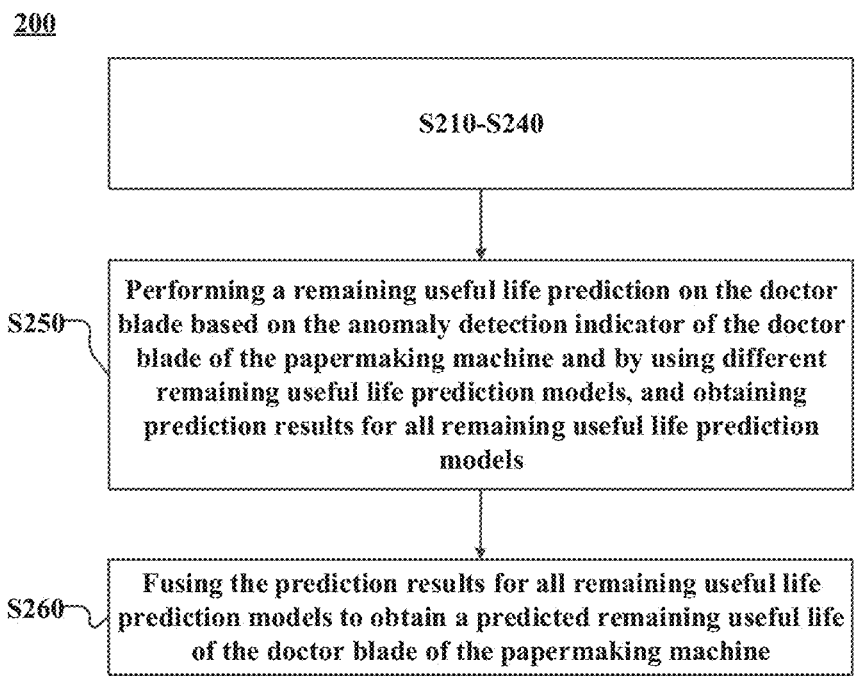
FIG. 3 is another flowchart of a method for anomaly detection on a doctor blade of a papermaking machine according to the embodiments of the present disclosure.

It should be understood that the following description that provides the embodiments is for the purpose of illustration only and not limitation. The exemplary division among functional blocks, modules or units shown in the figures should not be construed as implying that these functional blocks, modules or units must be implemented as physically separated units. The functional blocks, modules or units shown or described may be implemented as independent units, circuits, chips, functions, modules or circuit elements. One or more functional blocks or units may also be implemented in a common circuit, chip, circuit element or unit.

Although the present disclosure makes various references to certain modules in the system according to the embodiments of the present disclosure, any number of different modules may be used and run on user terminals and/or servers. The modules are illustrative only, and different aspects of the apparatus and method may use different modules.

Flowcharts are used in the present disclosure to illustrate operations performed according to one or more embodiments of the present disclosure. It should be understood that the preceding or following operations are not necessarily performed exactly in sequence. Instead, the various steps may be processed in a reverse order or concurrently, as desired. Meanwhile, other actions may also be added to these processes, or one or several steps may be removed from these processes.

The technical solutions in the embodiments of the present disclosure will be clearly and completely described below with reference to the accompanying drawings in the embodiments of the present disclosure. Obviously, the described embodiments are only some, but not all, embodiments of the present disclosure. Based on the embodiments in the present disclosure, all other embodiments obtained by those of ordinary skill in the art without paying creative efforts fall within the protection scope of the present disclosure.

For health status evaluation and anomaly detection on the doctor blade, currently there are some evaluation methods based on status monitoring, but these methods only monitor the overall running trend of the doctor blade, only extract a single type of signal of the doctor blade or detect the change trend of the signal, for example, a single vibration signal may be acquired to determine that currently the anomaly occurs to the doctor blade and the doctor blade thus should be replaced. For example, if the chatter of the doctor blade is large, then the amplitude of corresponding vibration signal detected will be large, so occurrence of the anomaly is indicated in the case where the threshold is exceeded.

For example, FIGS. 1A-1D are schematic diagrams of feature values (changing over time) of four feature parameters of a doctor blade under the same working condition during the test.

As shown in FIGS. 1A-1D, the abscissa is the time, and the ordinate is a feature value of a feature parameter (e.g., the vibration signal of the doctor blade). With the passage of time, the feature value of each feature parameter gradually increases, and the trend of the change of the feature value of each feature parameter is similar, that is, the feature value gradually increases over time. When the feature value of each feature parameter exceeds the threshold, it indicates that the anomaly occurs to the doctor blade, so the doctor blade needs to be replaced.

However, for this method, it is not comprehensive to detect the anomaly of the doctor blade only through a small number of simple signals, and influences of the working condition and other feature parameters of the doctor blade are not taken into consideration either. In addition, this method cannot predict the remaining useful life of the doctor blade.

Therefore, the present disclosure provides a comprehensive solution for anomaly detection on the doctor blade. In the method proposed in the present disclosure, comprehensive anomaly detection is performed on the features of the doctor blade by combining various different anomaly detection manners, in which a more comprehensive method and indicator can be obtained based on the three-level fusion of data level, feature level and decision level to reflect the anomaly risk of the doctor blade, so that more accurate and timely warning, alarm, feedback and optimization strategies can be provided for the doctor blade. In addition, the remaining useful life of the doctor blade can be predicted by establishing a model, which further improves the functionality of the papermaking machine.

The anomaly detection method proposed by the present disclosure will be described in detail below with reference to the accompanying drawings.

FIG. 2 shows a schematic flowchart of a method for anomaly detection on a doctor blade of a papermaking machine according to the embodiments of the present disclosure.

The method may be performed by a computing device with a processing function, and the computing device may include a server or a terminal. The terminal may include but not limited to: a smart phone, a tablet computer, a notebook computer, a desktop computer, a smart TV, etc. Various clients (e.g., application, APP) may run in the terminal, such as a multimedia playback client, a social client, a browser client, a feed client, an education client, etc. The server may be an independent physical server, may also be a server cluster composed of multiple physical servers or a distributed system, may also be a cloud server that provides basic cloud computing services such as cloud service, a cloud database, cloud computing, a cloud function, cloud storage, network service, cloud communication, middleware service, domain name service, security service, CDN, as well as big data and artificial intelligence platform.

As shown in FIG. 2, in step S210, doctor blade-related data is obtained, wherein the doctor blade-related data includes working condition data, status monitoring data, and design parameter data of the doctor blade.

It should be understood that the data here (working condition data, status monitoring data and design parameter data) may be, for example, analog data; or may also be digital data, such as the data related to the value of a voltage signal or current signal. The embodiments of the present disclosure are not limited by the data type of the data.

The working condition data may include data reflecting the real-time processing status of the doctor blade, for example, may include but not limited to time stamp data, Yankee cylinder rotational speed data, process type data, Yankee cylinder surface data, coating material type data, pulp raw material type data, processing ambient temperature data, processing ambient humidity data, etc. One or more types of data to be acquired may be selected based on factory and business requirements. The embodiments of the present disclosure are not limited by the specific composition and type of target working condition data. In the present disclosure, since anomaly detection on the doctor blade of the papermaking machine is required, the selected working condition data is the type of data that is sensitive to the health status of the doctor blade or the type of data that affects the health status of the doctor blade.

The status monitoring data of the doctor blade may include data obtained by monitoring the real-time status of the doctor blade, which can directly or indirectly reflect the real-time status of the doctor blade. The status monitoring data may include but not limited to doctor blade vibration data (e.g., acceleration data of real-time vibration of bearings at a driving end and a non-driving end of a fixing bracket for the doctor blade), contact force data, acoustic transmission data, ultrasonic data, image data, resistance data, temperature data, etc. The embodiments of the present disclosure are not limited by the specific type and composition of the status monitoring data.

The design parameter data of the doctor blade may include various types of data reflecting the inherent design characteristics of the doctor blade, for example, may include but not limited to doctor blade material type data, batch data, load data, designed life data, adjustment and replacement record data etc. The embodiments of the present disclosure are not limited by the specific type and composition of the design parameter data.

In addition, the working condition data, the status monitoring data, and the design parameter data of the doctor blade may be obtained in different manners.

For the working condition data, the working condition data may be obtained from a dedicated acquisition device (e.g., a programmable controller), wherein the dedicated acquisition device acquires the working condition data according to a predetermined sampling frequency, and the computing device may obtain the working condition data from the working condition data acquired by the dedicated acquisition device. Of course, the embodiments of the present disclosure are not limited by the specific source of the working condition data and the obtaining manner thereof.

For the status monitoring data of the doctor blade, the status monitoring data of the doctor blade may be obtained from a sensor device(s) built in the doctor blade or provided outside the doctor blade, wherein the sensor device collects various types of status monitoring data to acquire the status monitoring data of the doctor blade. For example, a temperature sensor acquires temperature data at the doctor blade, a force sensor acquires contact force data on the doctor blade, and an image sensor acquires image data of the doctor blade, and so on. The computing device may obtain one or more types of data from the doctor blade status monitoring data acquired by these sensor devices. The embodiments of the present disclosure are not limited by the specific source of the status monitoring data and the obtaining manner thereof.

For the design parameter data, the computing device may search an information database for obtaining the design parameter data, or may manually collect the design parameter data according to actual requirements. The embodiments of the present disclosure are not limited by the specific source of the design parameter data and the obtaining manner thereof.

In step S220, data pre-processing is performed on the doctor blade-related data based on a predetermined pre-processing manner to obtain a pre-processed data set, wherein the pre-processed data set includes the processed data respectively corresponding to the working condition data, the status monitoring data, and the design parameter data.

After the above-mentioned working condition data, status monitoring data, and design parameter data are obtained in step S210, since these pieces of data come from different sources and are obtained based on different manners, in order to ensure the data to be real-time and accurate, the pre-processing process first includes synchronizing the data obtained from different sources to obtain an original data set. For example, synchronization may be performed through a synchronization module provided in the computing device (e.g., a synchronization module in a data interface).

Specifically, for example, when the working condition data, the status monitoring data and the design parameter data are obtained through periodic sampling, due to different sampling frequencies and different starting time points of respective sampling processes, the obtained working condition data, status monitoring data and design parameter data, for example, have different starting time points on time axis, and their respective durations are different. It is also possible that partial data is missing or significantly inaccurate due to anomalies in corresponding sampling process, so that the data to be included in the obtained original data set may have incomplete data content in the spatial dimension, and the data may be discontinuous and the timings are not uniform in the temporal dimension. In this case, synchronization processing may be performed on the working condition data, the status monitoring data and the design parameter data in multiple dimensions to obtain the original data set. For example, the multiple dimensions include the spatial dimension and the temporal dimension. For example, the data may be processed in the time dimension based on the standard clock source to achieve synchronization and alignment between multi-source data. Meanwhile, various algorithms such as interpolation algorithms and conversion algorithms may be used to correct and complete data values (i.e., processing in the spatial dimension) to obtain a complete original data set for doctor blade status monitoring and evaluation.

On the basis of obtaining the working condition data, the status monitoring data and the design parameter data, synchronization processing operation is performed on the multi-source data in multiple dimensions such as the temporal dimension and the spatial dimension, so that synchronization and alignment of the multi-source data can be realized and it is beneficial to solve the problem of missing data content, thus the quality of the data in the obtained original data set is further improved, which is beneficial to subsequent processing and evaluation based on the data. At the same time, reliability and accuracy of the method for anomaly detection on the doctor blade are also improved.

Thereafter, the pre-processing process may further include further processing the original data set to obtain a pre-processed data set. The data processing operations in the pre-processing process of the original data set may include at least one of: a data deduplication process, a data denoising process, a data encoding process, and a data filtering process. Optionally, data processing operations may also be performed firstly on the obtained working condition data, status monitoring data, and design parameter data, and then the above-mentioned synchronization processing operation for the multi-source data is performed, which is not limited in the present disclosure.

The data deduplication process is intended to remove duplicate data in a target data set (e.g., the original data set). For example, duplicate data may be retrieved and removed based on data such as timestamps, process numbers, etc.

The data denoising process is intended to remove outliers in data so as to realize data optimization. For example, distance-based detection, statistics-based detection, distribution-based outlier detection, density clustering detection, boxplot detection and other methods may be used to denoise the data, so as to remove outliers in the data.

The data encoding is intended to represent the process of processing data based on preset rules to obtain encoded data with a uniform target data format. For example, the required target data format may be determined according to analysis, modeling and evaluation, and the data is encoded accordingly based on the target data format so as to facilitate subsequent processing.

The data filtering is intended to identify and remove noise in the data to improve the contrast of valid feature information in the data. For example, weighted average filters, median filters, Gaussian filters, Wiener filters, and other methods may be used to implement the data filtering process.

As an example rather than limitation, at least one of the above pre-processing processes may be performed differently for the obtained different types of doctor blade-related data.

For example, for the case where the working condition data is Yankee cylinder rotational speed data, coating material type data, and pulp raw material type data, the dynamic boxplot may be used to filter out outlier data in the Yankee cylinder rotational speed data (data denoising), and dummy variables may be used in performing discretized encoding (data encoding) on the material type data and pulp raw material type data; for the case where the status monitoring data is the acceleration data of real-time vibration of bearings at a driving end and a non-driving end of the fixing bracket for the doctor blade, an envelope processing with a specific frequency range (determined based on experience) may be used to obtain the envelope spectrum data of the acceleration data; for the case where the design parameter data is doctor blade material type data, dummy variables may be used in performing discretized encoding, and so on. Of course, different pre-processing processes may be selected according to the required data format and quality requirements, which is not limited in the present disclosure.

It should be understood that the above only provides an exemplary pre-processing process. Other pre-processing manners may also be selected according to actual requirements.

In step S230, feature extraction is performed on the pre-processed data set based on a predetermined feature extraction manner, and the extracted features are fused to obtain the fused feature data.

The feature extraction is intended to represent the process of extracting a feature description of at least a portion of the data in the pre-processed data set for the doctor blade. That is, for example, for each feature parameter, the pre-processed data set may include multiple pieces of data for the feature parameter at multiple sampling time points, then a data description feature capable of describing the multiple pieces of data may be extracted based on the multiple pieces of data. That is, for example, for the resistance feature, the pre-processed data set may include multiple pieces of resistance value data at multiple sampling time points, and then an average value feature capable of describing the multiple pieces of resistance value data may be extracted based on the multiple pieces of resistance value data.

Optionally, the feature extraction step described in this step S230 may specifically include the following steps: for a detection occasion, extracting a data description feature corresponding to each feature parameter related to the working condition data in the pre-processed data set within a preset time period related to the detection occasion; extracting a data description feature corresponding to each feature parameter related to the status monitoring data in the pre-processed data set within the preset time period; extracting a data description feature corresponding to each feature parameter related to the design parameter data in the pre-processed data set within the preset time period; and obtaining the fused feature data through the feature fusion processing and based on the data description feature corresponding to each feature parameter respectively related to the working condition data, the status monitoring data, and the design parameter data.

Optionally, for the a detection occasion, only data within a preset time period (also referred to as a sliding window) related to the detection occasion (also referred to as a sampling point) in the pre-processed data set may be selected to perform anomaly detection, thereby anomaly detection result at this detection occasion is obtained. For example, at each detection occasion, the doctor blade-related data within a preset time period (e.g., 5 minutes) before the detection occasion may be obtained, or the doctor blade-related data within a preset time period after the detection occasion may also be obtained, or the doctor blade-related data within a preset time period before and after the detection occasion may be obtained. The time length of the preset time period may also be appropriately selected according to actual requirements, which is not limited in the present disclosure.

It should be understood that, within the preset time period, the mentioned working condition data, status monitoring data, and design parameter data each include data of at least one feature parameter (e.g., sampled at a certain frequency). For example, within the preset time period, the status monitoring data includes vibration data, contact force data, doctor blade resistance data etc. of the doctor blade.

When feature extraction is performed on the working condition data, the status monitoring data, and the design parameter data in the pre-processed data set, different feature extraction manners may be adopted according to the type and characteristics of pieces of data for respective feature parameters respectively related to the working condition data, the status monitoring data, and the design parameter data, so as to extract different types of data features. The embodiments of the present disclosure are not limited to the specific manner of feature extraction.

Based on actual requirements, performing feature extraction on the pre-processed data set may include, for example, time domain feature extraction, frequency feature extraction, time-frequency domain feature extraction, and waveform feature extraction.

The time domain feature extraction refers to extracting a time domain feature of data (e.g., the acquired signals), including but not limited to mean, variance, standard deviation, maximum, minimum, root mean square, peak-to-peak, skewness, kurtosis, waveform indicator, pulse indicator, margin indicator etc. The frequency feature extraction refers to extracting a frequency feature of data, including but not limited to mean square frequency, frequency variance, frequency band energy, etc. The time-frequency domain feature extraction refers to extracting a time-frequency domain feature of data, including but not limited to frequency band energy or time domain characteristics of the data after wavelet decomposition or empirical mode decomposition. The waveform feature extraction refers to extracting a waveform feature of the data, for example, when the data is related to the value of an acquired signal, the waveform feature includes but not limited to the feature of area enclosed by the signal waveform, the maximum/minimum derivative, the rising edge, or the falling edge, etc.

For example, in the case where feature extraction is performed on the (processed) working condition data in the pre-processed data set, when the working condition data is Yankee cylinder rotational speed data, coating material type data, and pulp raw material type data, the averaging within a sliding window may be used to obtain the Yankee cylinder rotational speed feature, and the dummy variables after data-encoding as described above are used as the feature to characterize the coating material type data and the pulp raw material type data, which are used respectively as the data description features respectively corresponding to the Yankee cylinder rotational speed, the coating material type, and the pulp raw material type (which may be used in the following text interchangeably with the Yankee cylinder rotational speed feature, the coating material type feature, and the pulp raw material type feature). The features extracted with respect to the working condition data are also referred to as working condition features.

For example, in the case where feature extraction is performed on the (processed) status monitoring data in the pre-processed data set, when the status monitoring data is acceleration data of real-time vibration of bearings at a driving end and a non-driving end of a fixing bracket for the doctor blade and temperature data, a total value of frequencies in the frequency spectrum, within a first frequency range, of the acceleration signal corresponding to the original vibration acceleration data at each detection occasion (sampling point) may be extracted as its acceleration feature, and a total value of frequencies in the envelope spectrum, within a second frequency range (e.g., it may be smaller than the first frequency range), at each detection occasion (sampling point) may be extracted as its envelope feature; and an average value of the temperature signal corresponding to temperature data within a sliding window at each detection occasion (sampling point) may be extracted as its temperature feature. In addition, the feature extraction is performed for both the driving end and the non-driving end, and a total of 6 features are obtained, which are used as the data description features respectively corresponding to feature parameters of the acceleration, envelope spectrum and temperature (which may be used interchangeably with the acceleration feature, the envelope feature total value feature and temperature feature respectively in the following text). Features extracted with respect to status monitoring data are also referred to as the status monitoring features.

For example, in the case where feature extraction is performed on the design parameter data in the pre-processed data set, when the design parameter data is doctor blade material type data, the dummy variables after data-encoding as described above may be directly used as the data description feature corresponding to the feature parameter of the doctor blade material type data (it may be used interchangeably with the doctor blade material type feature in the following text). The feature extracted with regard to the design parameter data is also referred to as the design parameter feature.

Optionally, the extracted data description feature corresponding to each feature parameter may also be normalized, that is, subtracting the average value of data description feature (e.g., the acceleration feature of the driving end of the fixing bracket for the doctor blade, etc.) corresponding to each feature parameter from the value of data description feature, then the result is divided by the standard deviation corresponding to the data description feature, wherein the average value and standard deviation are obtained based on historical sampling data.

In this way, for each feature parameter, the data description feature corresponding to the feature parameter is extracted, and then the data description features corresponding to all feature parameters are fused to obtain the fused feature data.

For example, the data description feature corresponding to each feature parameter may be directly combined (e.g., concatenated) to obtain the fused feature data.

As an example rather than limitation, synchronous concatenation fusion may be performed on the extracted working condition feature, status monitoring feature, and design parameter feature based on the time axis to obtain a fused feature set, which is also referred to as the fused feature data.

Of course, other feature fusion manners in the field of data processing may also be used to performing fusion processing on the extracted working condition feature, status monitoring feature, and design parameter feature to obtain the fused feature data.

In addition, in order to more accurately characterize the doctor blade status, different weights may be assigned to each type of feature according to sensitivity for characterization of the doctor blade status. For example, the weight of status monitoring feature is higher than those of the working condition feature and the design parameter feature.

Furthermore, for at least one feature type of the working condition feature, the status monitoring feature and the design parameter feature, different weights are assigned to each data description feature under each feature type. For example, different weights are assigned to the acceleration feature, the envelope feature total value feature, and the temperature feature under the feature type of status monitoring feature.

In this way, as an example, the feature value of the data description feature corresponding to each feature parameter is multiplied by its corresponding weight as the corresponding feature value (a weighted feature value) in the fused feature set; and synchronous concatenation fusion is performed for all weighted feature values, as the fused feature data.

By performing feature fusion after feature extraction, the respective extracted data description features can be correlated in different dimensions, so as to obtain overall and comprehensive feature information based on the local and scattered features, which is beneficial to better reflect the characteristics of various aspects of the doctor blade, and is beneficial to improve the accuracy of anomaly detection.

For example, the fused feature data may be a multi-dimensional feature vector $F=\{F_i|i=1, 2, \ldots, k\}$, where k is an integer greater than or equal to 1, and $F_i$ represents the feature value of the i-th data description feature in the fused feature data. It should be understood that the fused feature data includes feature values of the data description features corresponding to feature parameters for the working condition data, the status monitoring data, and the design parameter data, respectively.

In step S240, the fused feature data is analyzed based on different anomaly detection manners respectively, so as to perform comprehensive anomaly detection on the doctor blade of the papermaking machine.

In this step, first, for example, the fused feature data may be analyzed based on different anomaly detection models, to obtain a detection result of each anomaly detection model.

Optionally, the anomaly detection model includes a K-sigma model, a boxplot model, a nearest neighbor algorithm model, a local outlier factor detection model, an MSET algorithm model, an isolation forest algorithm model or a support vector machine model. The anomaly detection model may be pre-trained based on a training sample set, wherein the training sample set is obtained from historical working condition data, historical status monitoring data, and historical design parameter data.

For example, pieces of historical fused feature data corresponding to multiple historical detection occasions (obtained through similar data acquisition, data pre-processing, feature extraction, and feature fusion processes) may be obtained, and labeled detection results for the pieces of historical fused feature data for these historical detection occasions may be obtained, as a training sample set to train or model the respective anomaly detection models. For example, during training or modeling, a proportion of abnormal samples (negative samples) may be preset, so that the model will perform anomaly detection based on training sample set including the abnormal samples of this proportion.

Optionally, the detection results outputted by the respective anomaly detection models may be normalized to a value between 0 and 1, representing a probability or degree of anomaly of the doctor blade respectively.

Thereafter, the detection results of all anomaly detection models are fused to obtain the anomaly risk indicator of the doctor blade of the papermaking machine at the current detection occasion. In addition, the anomaly risk indicator obtained at the current detection occasion is added to the anomaly risk indicator set that also includes anomaly risk indicators at other multiple detection occasions, which can be used for subsequent remaining useful life (RUL) prediction.

Optionally, fusion of the detection results may include calculating average, weighted average, median, maximum, minimum of these detection results, and even calculating a comprehensive indicator and the like.

As an example rather than limitation, different weights may be assigned to different models based on a degree of consistency between the value of the detection result of each anomaly detection model and the actual degradation trend of the doctor blade status (which may be obtained from empirical values), for example, corresponding weights are assigned respectively for the local outlier factor detection model, the MSET algorithm model, the isolation forest algorithm model and the support vector machine model.

In this way, the detection result of each anomaly detection model may be weighted to obtain the anomaly risk indicator of the doctor blade of the papermaking machine at the current detection occasion. Optionally, after obtaining the anomaly risk indicator of the doctor blade of the papermaking machine at the current detection occasion, the method may further include determining that anomaly occurs to the doctor blade when the anomaly risk indicator exceeds a preset threshold, and performing an early warning operation to indicate the need for manual inspection or replacement of the doctor blade.

Based on the method for anomaly detection on a doctor blade of a papermaking machine described with reference to FIG. 2, a comprehensive anomaly detection is performed on the doctor blade features by combining various anomaly detection manners, a more comprehensive method and indicator can be obtained based on the three-level fusion of data level, feature level and decision level to reflect the anomaly risk of the doctor blade, so that more accurate and timely warning, alarm, feedback and optimization strategies can be provided for the doctor blade.

According to another aspect of the present disclosure, the remaining useful life of the doctor blade may also be predicted based on the anomaly risk indicator of the doctor blade of the papermaking machine obtained through comprehensive anomaly analysis. In this way, the functionality of the papermaking machine can be further enhanced.

As shown in FIG. 3, the method 200 may further include step S250: performing a remaining useful life prediction on the doctor blade based on the anomaly detection indicator of the doctor blade of the papermaking machine and by using different remaining useful life prediction models, and obtaining prediction results for all remaining useful life prediction models.

Optionally, each remaining useful life prediction model can be used to predict the remaining useful life of the doctor blade based on the current anomaly risk indicator and the designed useful life of the doctor blade (e.g., which may be obtained from the design parameter data).

Alternatively, each remaining useful life prediction model can be used to predict the remaining useful life of the doctor blade based on the current anomaly risk indicator set and the designed useful life of the doctor blade (which may be obtained from the design parameter data). Optionally, the current anomaly risk indicator set may include anomaly risk indicators at multiple previous and current detection occasions.

Additionally, various remaining useful life (RUL) prediction models may be used to predict the remaining useful life of the doctor blade, wherein each RUL prediction model may be a model that associate the remaining useful life of the doctor blade with the anomaly risk indicator and the designed useful life of the doctor blade based on different criteria.

For example, anomaly risk indicators corresponding to multiple historical detection occasions (only the values of the indicators are used) or the anomaly risk indicator set (the change trend of the values of the indicator may be utilized) as well as the designed useful life of the corresponding doctor blade may be obtained, and labeled predicted results for the corresponding anomaly risk indicators or the anomaly risk indicator set and the designed useful life may be obtained, as a training sample set to train or model the respective different RUL prediction models differently.

In step S260, the prediction results for all remaining useful life prediction models are fused to obtain the predicted remaining useful life of the doctor blade of the papermaking machine.

Optionally, as an example rather than limitation, the remaining useful life prediction models may include a theoretical degradation model MI and an anomaly loss model MA, wherein the theoretical degradation model MI is a theoretical model for the doctor blade that is degraded by the design life over time; and the anomaly loss model MA is an additional loss model for the doctor blade due to the anomaly condition during the usage of the doctor blade, which will act on the theoretical degradation model with a certain coefficient factor to increase its degradation speed, and may be a function of the anomaly risk indicator obtained in the aforementioned anomaly detection process.

Therefore, fusing the prediction results for all remaining useful life prediction models to obtain a predicted remaining useful life of the doctor blade of the papermaking machine may include: predicting by using the theoretical degradation model to obtain a theoretical remaining useful life at the current detection occasion; predicting by using the anomaly loss model based on the anomaly detection indicator at the current detection occasion to obtain a loss-based remaining useful life at the current detection occasion; and obtaining the predicted remaining useful life based on the theoretical remaining useful life and the loss-based remaining useful life.

This prediction process may be expressed as follows: $RUL(FINAL)=RUL(MI)-\alpha*RUL(MA)$, where RUL(FINAL) is the final predicted remaining useful life of the doctor blade, RUL(MI) is the theoretical remaining useful life at the current detection occasion, RUL(MA) is the loss-based remaining useful life obtained based on the abnormal detection indicator at the current detection occasion, a is the coefficient factor of the anomaly loss model MA acting on the theoretical degradation model and is a value between 0 and 1.

Of course, the above is just an example, and the remaining useful life prediction model may have other designs, so the fusion of the prediction results may be different accordingly.

Based on the method for anomaly detection on a doctor blade of a papermaking machine described with reference to FIGS. 2 to 3, while determining the anomaly risk of the doctor blade, the final remaining useful life can also be comprehensively predicted based on the theoretical remaining useful life and the loss-based remaining useful life at the current detection occasion, which can further enhance the functionality of the papermaking machine.

Based on the detailed description of the methods described above with reference to FIGS. 2 to 3, FIG. 4 shows a schematic diagram of a corresponding exemplary process.

Figure 4:
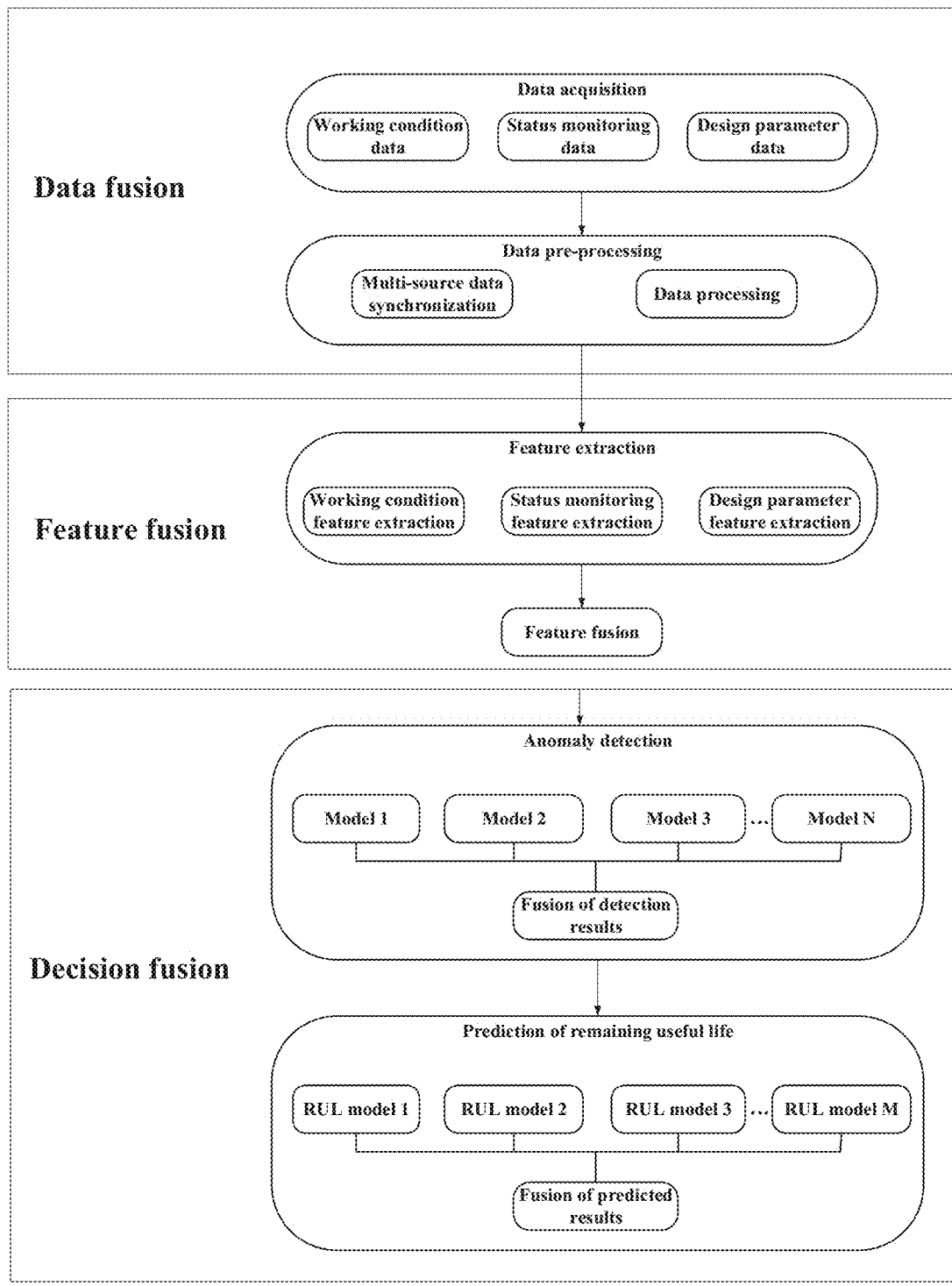
FIG. 4 is a schematic diagram of a process for anomaly detection on a doctor blade of a papermaking machine according to the embodiments of the present disclosure.

As shown in FIG. 4, first, in the data acquisition process, the doctor blade-related data is obtained, wherein the doctor blade-related data includes working condition data, status monitoring data, and design parameter data of the doctor blade.

Thereafter, in the pre-processing process, the doctor blade-related data is pre-processed to obtain a pre-processed data set. In the process of pre-processing, the data processing operation and synchronous processing operation on multi-source data are included, and data fusion can be achieved.

Next, in the feature extraction process, feature extraction is respectively performed on the processed data corresponding to the working condition data, the status monitoring data, and the design parameter data.

Next, in the feature fusion process, respective extracted features are fused to obtain a multi-dimensional feature vector including data description features corresponding to the feature parameters related to the above three types of data, as the fused feature data.

Thereafter, in the anomaly detection process, the fused feature data is analyzed based on different anomaly detection manners, so as to perform comprehensive anomaly detection on the doctor blade of the papermaking machine. For example, the fused feature data may be analyzed through N anomaly detection models (models 1 to N) separately to obtain the detection results of all anomaly detection models; and the detection results of all abnormal detection model are fused (e.g., weighted) to obtain the anomaly detection indicator of the doctor blade of the papermaking machine.

Finally, in the process of predicting the remaining useful life, the remaining useful life of the doctor blade is predicted based on the anomaly risk indicator of the doctor blade of the papermaking machine and using M remaining useful life prediction models (RUL models 1 to M), and the prediction results of all remaining useful life prediction model are obtained; then, the prediction results of all remaining useful life prediction models are fused to obtain the predicted remaining useful life of the doctor blade of the papermaking machine.

Some test results of the method for anomaly detection on a doctor blade of a papermaking machine according to the embodiments of the present disclosure will be described below with reference to FIGS. 5 to 8, so as to better help understand more details of the embodiments of the present disclosure.

FIGS. 5A-5D show trend graphs of detection results of four anomaly detection models for anomaly detection on one doctor blade.

Figure 5A:
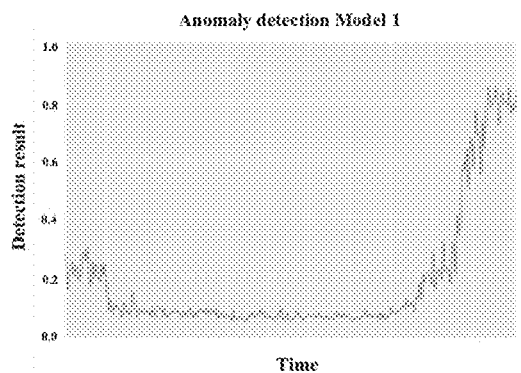
FIGS. 5A-5D are trend graphs of a detection results of each of four anomaly detection models for anomaly detection on one doctor blade.
Figure 5B:
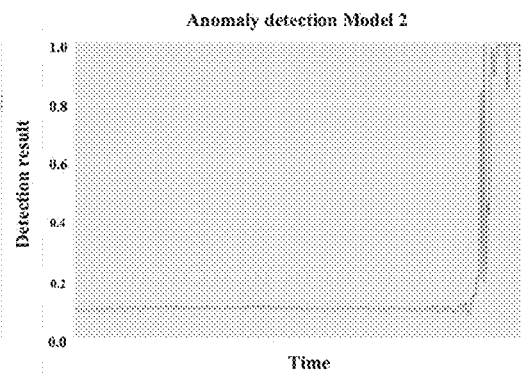
Figure 5C:
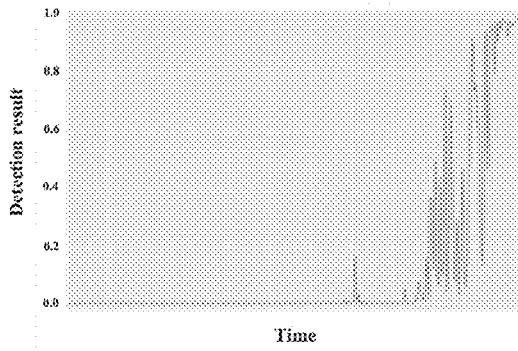
Figure 5D:
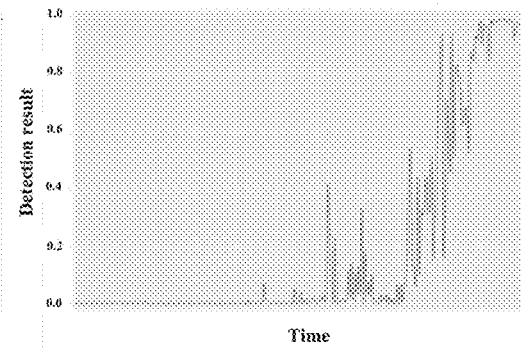
Figure 6A:
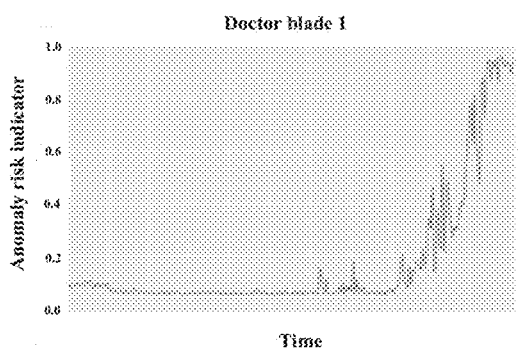
FIGS. 6A-6D are trend graphs of an anomaly risk indicator for each of four doctor blades.
Figure 6B:
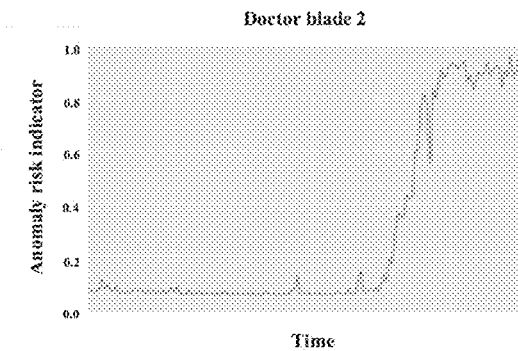
Figure 6C:
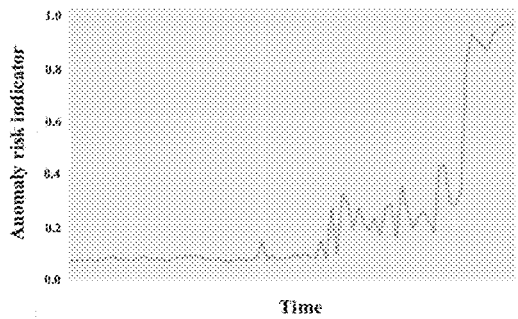
Figure 6D:
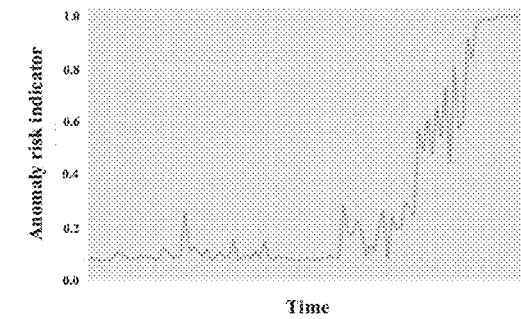
Figure 7A:
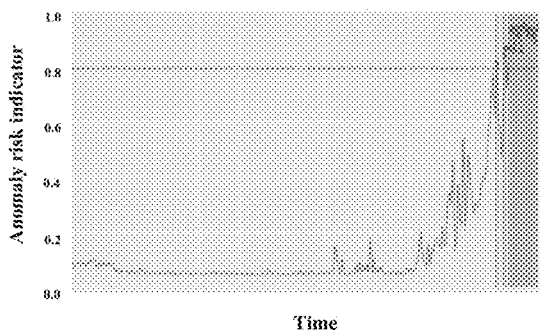
FIGS. 7A-7D are schematic diagrams of early warning based on an anomaly risk indicator for each of four doctor blades.
Figure 7B:
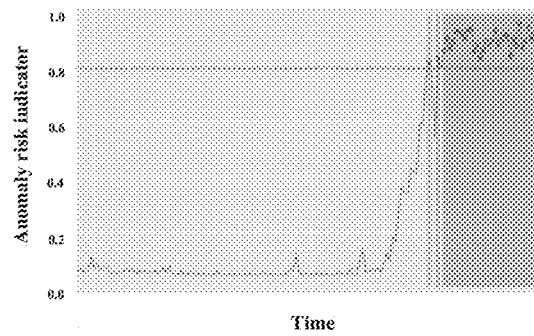
Figure 7C:
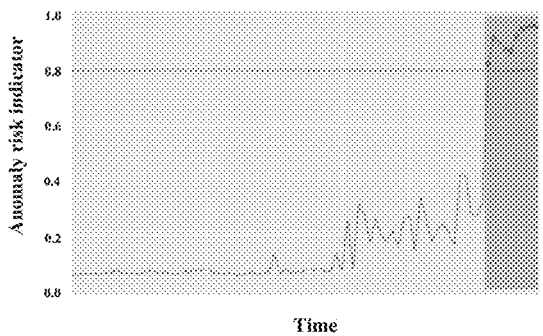
Figure 7D:
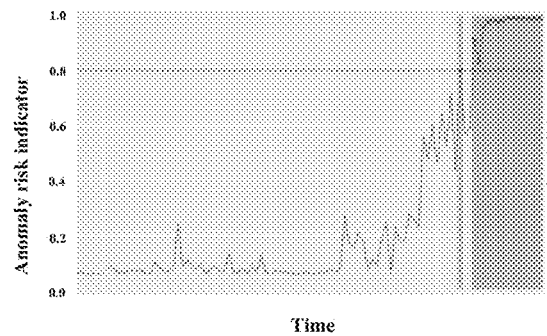
Figure 8A:
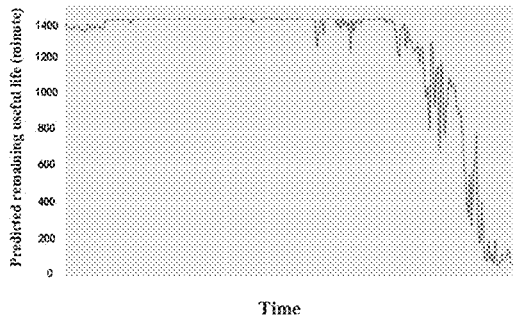
FIGS. 8A-8D are trend graphs of a predicted remaining useful life for each of four doctor blades.
Figure 8B:
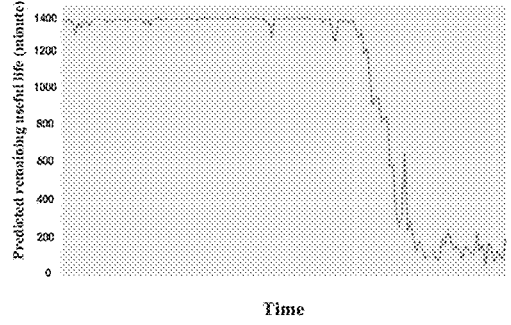
Figure 8C:
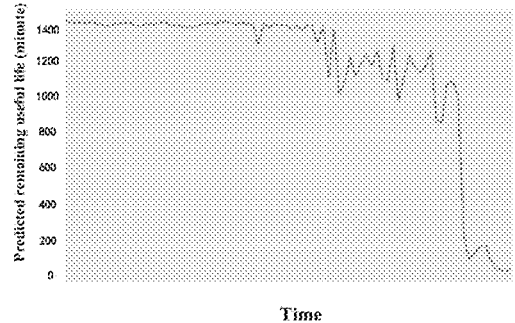
Figure 8D:
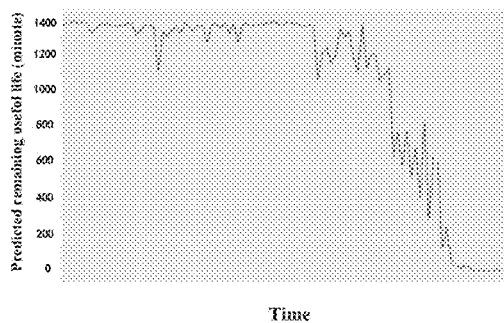

As shown in FIGS. 5A-5B, the detection result of each abnormal detection model basically increases gradually over time, which indicates that as the usage time of the doctor blade becomes longer and longer, the probability that anomaly occurs to the doctor blade is correspondingly higher and higher, even though there may be some fluctuations due to errors and changes in the working condition. This is also in accordance with the change law of the doctor blade. For example, the wear of the doctor blade increases along with the increase of usage time, and the probability of anomaly occurring to the doctor blade increases accordingly.

The detection results of the four anomaly detection models will be used for fusion to obtain a comprehensive anomaly risk indicator, accordingly, the trend of the anomaly risk indicator will gradually increase over time accordingly.

FIGS. 6A-6D shows trend graphS of anomaly risk indicator for four doctor blades.

As shown in FIGS. 6A-6D, the anomaly risk indicator of each of different doctor blades basically increases gradually with time, which indicates that even for different doctor blades, as the usage time of each doctor blade is longer and longer, a corresponding probability of occurrence of anomaly to the doctor blade is larger and larger, thus the anomaly risk indicator is accordingly larger and larger.

FIGS. 7A-7D shows schematic diagrams of an early warning based on an anomaly risk indicator for each of four doctor blades.

As shown in FIGS. 7A-7D, it is assumed that a preset threshold of the anomaly risk indicator is 0.8, when the value of the anomaly risk indicator of each doctor blade exceeds 0.8, an early warning will be issued. For example, the anomaly risk indicator and/or a time period corresponding to these detection occasions may be highlighted on a display interface.

FIGS. 8A-8D show trend graphs of a predicted remaining useful life for four doctor blades.

As shown in FIGS. 8A-8D, as the usage time of each doctor blade becomes longer and longer and the value of the anomaly risk indicator becomes larger and larger accordingly, the value of the predicted remaining useful life of each doctor blade gradually decreases. The maximum remaining useful life for each doctor blade corresponds to the time when the doctor blade is new.

It can be seen that, through the method for anomaly detection on a doctor blade of a papermaking machine according to the embodiments of the present disclosure, comprehensive anomaly detection is performed on the doctor blade by combining various different anomaly detection manners, a more comprehensive method and indicator can be obtained based on the three-level fusion of data level, feature level and decision level to reflect the anomaly risk of the doctor blade, so that more accurate and timely warning, alarm, feedback and optimization strategies can be provided for the doctor blade. At the same time, while determining the anomaly risk of the doctor blade, the remaining useful life can also be comprehensively predicted, which can further enhance the functionality of the papermaking machine. In addition, the required model can also be trained and modeled based on big data or machine learning, so as to realize anomaly detection on the doctor blade in a digital and intelligent way.

Figure 9:
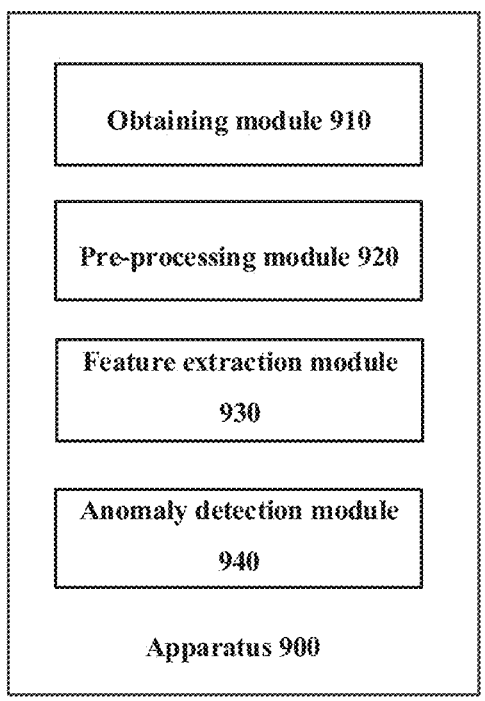
FIG. 9 is a structural block diagram of an apparatus for anomaly detection on a doctor blade of a papermaking machine according to the embodiments of the present disclosure.

In accordance with another aspect of the present disclosure, FIG. 9 shows a structural block diagram of an apparatus for anomaly detection on a doctor blade of a papermaking machine according to the embodiments of the present disclosure.

As shown in FIG. 9, the apparatus 900 comprises an acquisition module 910, a pre-processing module 920, a feature extraction module 930, and an anomaly detection module 940.

The acquisition module 910 may obtain doctor blade-related data, wherein the doctor blade-related data includes working condition data, status monitoring data, and design parameter data of the doctor blade.

Thereafter, the pre-processing module 920 may perform data pre-processing on the doctor blade-related data based on a predetermined pre-processing manner to obtain a pre-processed data set, wherein the pre-processed data set includes processed data corresponding to the working condition data, the status monitoring data, and the design parameter data respectively.

Next, the feature extraction module 930 may perform feature extraction on the pre-processed data set based on a predetermined feature extraction manner, and may fuse the extracted features to obtain fused feature data.

Last, the anomaly detection module 940 may analyze the fused feature data based on different anomaly detection manners respectively, so as to perform comprehensive anomaly detection on the doctor blade of the papermaking machine.

In addition, it should be noted that the apparatus 900 may include more or less modules according to the functions to be performed. For example, it may further include a prediction module for performing a remaining useful life prediction on the doctor blade by using multiple prediction models and based on the anomaly risk indicator, and include a warning module for determining that anomaly occurs to the doctor blade of the papermaking machine when the abnormal detection indicator of the doctor blade exceeds a preset threshold and performing an early warning operation. In addition, each module may be further divided into multiple sub-modules to complete the required operations.

More details of the operations of the above respective modules of the apparatus 900 have been described in detail above with reference to FIGS. 2 to 8, so no repetition will be made here.

It can be seen that, through the apparatus for anomaly detection on a doctor blade of a papermaking machine according to the embodiments of the present disclosure, comprehensive anomaly detection is performed on the doctor blade by combining various different anomaly detection manners, a more comprehensive method and indicator can be obtained based on the three-level fusion of data level, feature level and decision level to reflect the anomaly risk of the doctor blade, so that more accurate and timely warning, alarm, feedback and optimization strategies can be provided for the doctor blade. At the same time, while determining the anomaly risk of the doctor blade, the final remaining useful life can also be comprehensively predicted based on the theoretical remaining useful life and the remaining useful life obtained based on the current loss, which can further enhance the functionality of the papermaking machine. In addition, the required models can also be trained and modeled based on big data or machine learning, so as to realize anomaly detection on the doctor blade in a digital and intelligent way.

Figure 10:
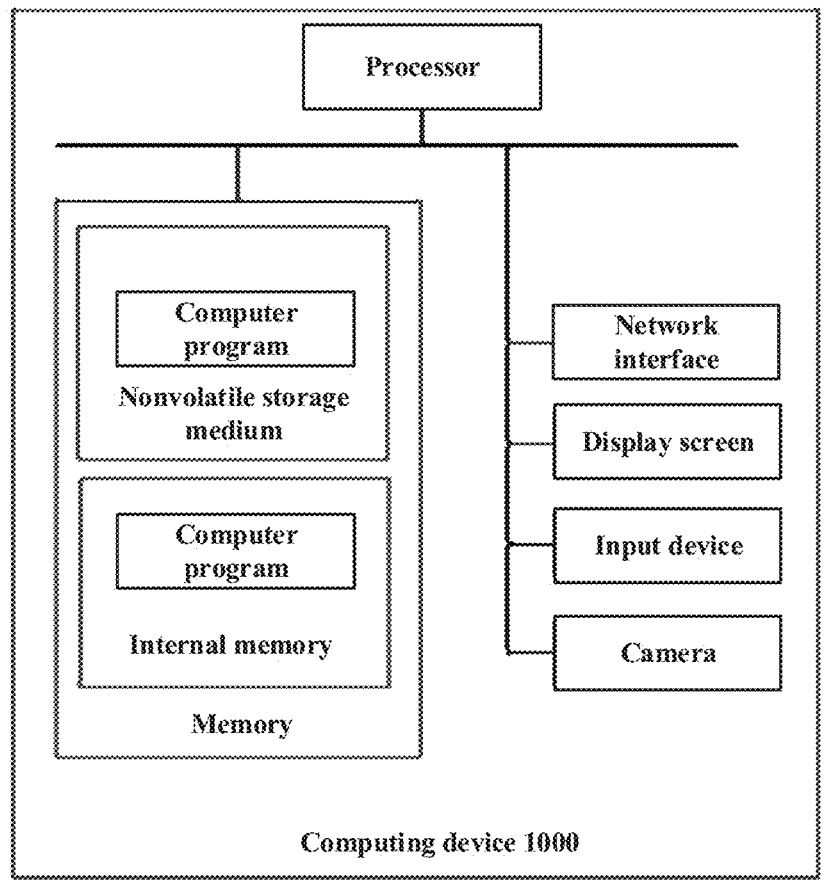
FIG. 10 is a structural block diagram of a computing device according to the embodiments of the present disclosure.

In accordance with another aspect of the present disclosure, FIG. 10 shows a structural block diagram of a computing device 1000 according to the embodiments of the present disclosure.

As shown in FIG. 10, the computing device 1000 includes a processor, a memory, a network interface, an input device and a display screen that are connected by a system bus. The memory includes a nonvolatile storage medium and an internal memory. The nonvolatile storage medium of the computing device stores an operating system, and may also store a computer program, which, when executed by a processor, can cause the processor to implement various operations described in respective steps of the aforementioned method for anomaly detection on a doctor blade of a papermaking machine. The internal memory may also store a computer program which, when executed by the processor, can cause the processor to perform various operations described in the respective steps of the same method for anomaly detection on a doctor blade of a papermaking machine.

For example, the operations of the method for anomaly detection on a doctor blade of a papermaking machine may include: obtaining doctor blade-related data, wherein the doctor blade-related data includes working condition data, status monitoring data, and design parameter data of the doctor blade; performing data pre-processing on the doctor blade-related data based on a predetermined pre-processing manner to obtain a pre-processed data set, wherein the pre-processed data set includes processed data respectively corresponding to the working condition data, the status monitoring data, and the design parameter data; performing feature extraction on the pre-processed data set based on a predetermined feature extraction manner, and fusing extracted features to obtain fused feature data; and analyzing the fused feature data based on different anomaly detection manners respectively, to perform comprehensive anomaly detection on the doctor blade of the papermaking machine. More details of each step have been described in detail above, so no repetition will be made here.

The processor may be an integrated circuit chip with signal processing capability. The processor described above may be a general-purpose processor, a digital signal processor (DSP), an application specific integrated circuit (ASIC), a Field Programmable Gate Array (FPGA) or other programmable logic devices, discrete gates or transistor logic devices, and discrete hardware components. The respective methods, steps and logic diagrams disclosed in the embodiments of the present disclosure can be implemented or executed. The general-purpose processor may be a microprocessor or the processor may also be any conventional processor, etc., which may be of X84 architecture or ARM architecture.

The nonvolatile memory may be a read only memory (ROM), a programmable read only memory (PROM), an erasable programmable read only memory (EPROM), an electrically erasable programmable read only memory (EEPROM) or a flash memory. It should be noted that the memories of the methods described in the present disclosure are intended to include but not limited to these and any other suitable types of memories.

The display screen of the computing device may be a liquid crystal display screen or an electronic ink display screen, and the input device of the computing device may be a touch layer covered on the display screen, may also be a button, a trackball or a touch pad disposed on the housing, and may also be an external keyboard, a touch pad or a mouse. The computing device may be a terminal or a server.

In accordance with another aspect of the present disclosure, there is also provided a computer readable storage medium storing a computer program which, when executed by a processor, causes the processor to execute the respective steps of the method for abnormal detection on a doctor blade of a papermaking machine as described above.

In accordance with yet another aspect of the present disclosure, there is also provided a computer program product including a computer program, which, when executed by a processor, realizes the respective steps of the method for abnormal detection on a doctor blade of a papermaking machine as described above.

Although the present disclosure has been described in detail for various specific example embodiments thereof, each example is provided by way of explanation rather than limitation. Those skilled in the art can easily make alterations, changes and equivalents to such embodiments after understanding the above contents. Therefore, the present disclosure does not exclude such modifications, changes and/or additions to the subject matter that will be obvious to those of ordinary skill in the art. For example, features illustrated or described as part of one embodiment may be used with another embodiment to produce yet another embodiment. Therefore, it is intended that the present disclosure cover such alterations, variations and equivalents.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having the meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, those skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the embodiments of the present disclosure and other embodiments are intended to be included in the scope of the attached claims. The present disclosure is defined by the claims and their equivalents.

What is claimed is:

1. A method for anomaly detection on a doctor blade currently in use by a papermaking machine, comprising:
    obtaining doctor blade-related data, wherein the doctor blade-related data includes real-time working condition data, real-time status monitoring data, and design parameter data of the doctor blade currently in use by the papermaking machine;
    performing data pre-processing on the doctor blade-related data in a predetermined pre-processing manner to obtain a pre-processed data set, wherein the pre-processed data set includes processed data respectively corresponding to the real-time working condition data, the status monitoring data, and the design parameter data;
    performing feature extraction on the pre-processed data set in a predetermined feature extraction manner, and fusing extracted features to obtain fused feature data; and
    analyzing the fused feature data based on different anomaly detection processes respectively, to perform a comprehensive anomaly detection on the doctor blade currently in use by the papermaking machine.

2. The method according to claim 1, wherein the real-time working condition data includes Yankee cylinder rotational speed data, coating material type data, and pulp raw material type data; the real-time status monitoring data includes acceleration data of real-time vibration of bearings at a driving end and a non-driving end of a fixing bracket for the doctor blade and temperature data; and the design parameter data includes doctor blade material type data,
    wherein performing data pre-processing on the doctor blade-related data in a predetermined pre-processing manner to obtain a pre-processed data set comprises:
    performing at least one of the following pre-processing processes based on different types of data of the doctor blade-related data: a data deduplication process, a data denoising process, a data encoding process, and a data filtering process.

3. The method according to claim 1, wherein performing feature extraction on the pre-processed data set in a predetermined feature extraction manner and fusing extracted features to obtain fused feature data comprises: for a current detection occasion,
    extracting a data description feature corresponding to each feature parameter related to the real-time working condition data in the pre-processed data set within a preset time period related to the detection occasion, as a working condition feature;
    extracting a data description feature corresponding to each feature parameter related to the status monitoring data in the pre-processed data set within the preset time period, as a status monitoring feature;
    extracting a data description feature corresponding to each feature parameter related to the design parameter data in the pre-processed data set within the preset time period, as a design parameter feature; and
    obtaining the fused feature data through a feature fusion processing and based on the data description features corresponding to each feature parameter related to the real-time working condition data, the status monitoring data, and the design parameter data.

4. The method according to claim 3, further comprising:
assigning different weights to the working condition feature, the status monitoring feature and the design parameter feature according to corresponding sensitivity for characterization of a status of the doctor blade, and assigning, for at least one feature type of the working condition feature, the status monitoring feature and the design parameter feature, different weights to each data description feature under each feature type,
wherein obtaining the fused feature data through a feature fusion processing and based on the data description features corresponding to each feature parameter related to the real-time working condition data, the real-time status monitoring data, and the design parameter data comprises:
multiplying a feature value of the data description feature corresponding to each feature parameter with a corresponding weight to obtain a weighted feature value of the data description feature of the feature parameter; and
performing synchronous concatenation fusion for each weighted feature value, to obtain the fused feature data.

5. The method according to claim 1, wherein analyzing the fused feature data based on different anomaly detection processes respectively to perform comprehensive anomaly detection on the doctor blade of the papermaking machine comprises:
analyzing the fused feature data based on different anomaly detection models respectively, to obtain detection results of all anomaly detection models; and
fusing the detection results of all anomaly detection models to obtain an anomaly detection indicator of the doctor blade of the papermaking machine.

6. The method according to claim 5, wherein each anomaly detection model is pre-trained or modeled based on a training sample set, wherein the training sample set is obtained from historical working condition data, historical status monitoring data, and historical design parameter data, and
wherein the anomaly detection model includes a local outlier factor detection model, an MSET algorithm model, an isolation forest algorithm model or a support vector machine model, and wherein the detection results of all anomaly detection models are weighted to obtain the anomaly detection indicator of the doctor blade of the papermaking machine.

7. The method according to claim 6, further comprising:
performing a remaining useful life prediction on the doctor blade based on the anomaly detection indicator of the doctor blade of the papermaking machine and by using different remaining useful life prediction models, and obtaining prediction results for each remaining useful life prediction model; and
fusing the prediction results for all remaining useful life prediction models to obtain a predicted remaining useful life of the doctor blade of the papermaking machine.

8. The method according to claim 7, wherein the remaining useful life prediction models include a theoretical degradation model and an anomaly loss model,
wherein fusing the prediction results for all remaining useful life prediction models to obtain a predicted remaining useful life of the doctor blade of the papermaking machine comprises:
predicting by using the theoretical degradation model to obtain a theoretical remaining useful life at current detection occasion;
predicting by using the anomaly loss model based on the anomaly detection indicator at the current detection occasion to obtain a loss-based remaining useful life at the current detection occasion; and
obtaining the predicted remaining useful life based on the theoretical remaining useful life and the loss-based remaining useful life.

9. A computing device, comprising:
a computer processor; and
a memory having stored thereon a computer program which, when executed, causes the processor to implement respective steps of the method for anomaly detection on a doctor blade according to claim 1.

10. A non-transient computer-readable storage medium having computer-readable instructions stored thereon, wherein when the instructions are executed by a computer, the method of claim 1 is performed.

11. An apparatus for anomaly detection on a doctor blade of an operating papermaking machine, comprising a computer processor configured to:
obtain doctor blade-related data of a doctor blade currently in use by the papermaking machine, wherein the doctor blade-related data includes real-time working condition data, real-time status monitoring data, and design parameter data of the doctor blade;
perform data pre-processing on the doctor blade-related data in a predetermined pre-processing manner to obtain a pre-processed data set, wherein the pre-processed data set includes processed data respectively corresponding to the real-time working condition data, the real-time status monitoring data, and the design parameter data;
perform feature extraction on the pre-processed data set in a predetermined feature extraction manner, and to fuse extracted features to obtain fused feature data; and
analyze the fused feature data based on different anomaly detection processes respectively, to perform a comprehensive anomaly detection on the doctor blade of the papermaking machine.

* * * * *